United States Patent [19]

Regehr

[11] 4,198,215

[45] Apr. 15, 1980

[54] FIN DEFLECTOR FOR SEPARATING LIQUID FROM A LIQUID/VAPOR MIXTURE

[76] Inventor: Ulrich Regehr, Susterfeldstrasse 63, D-5100 Aachen, Fed. Rep. of Germany

[21] Appl. No.: 911,872

[22] Filed: Jun. 2, 1978

[30] Foreign Application Priority Data

Jun. 3, 1977 [DE] Fed. Rep. of Germany ... 7717599[U]

[51] Int. Cl.$^2$ ............................................. B01D 45/08
[52] U.S. Cl. ........................................ 55/185; 55/207; 55/440
[58] Field of Search ................................ 55/184–188, 55/199, 202, 206, 207, 440

[56] References Cited

U.S. PATENT DOCUMENTS

| | | | |
|---|---|---|---|
| 1,803,854 | 5/1931 | Kniskern | 55/440 X |
| 2,643,736 | 6/1953 | Smith | 55/440 |
| 3,490,210 | 1/1970 | Horton et al. | 55/440 |
| 3,912,471 | 10/1975 | Cotton, Jr. | 55/440 |
| 3,938,972 | 2/1976 | Sugimura | 55/440 |

*Primary Examiner*—John Adee
*Attorney, Agent, or Firm*—Finnegan, Henderson, Farabow, Garrett & Dunner

[57] ABSTRACT

The invention relates to a fin deflector for separating liquid from a liquid/vapor mixture, comprising a plurality of sinusoidal shaped fins which extend substantially transversely to the direction of throughflow and have in their longitudinal direction liquid collecting channels which lead the liquid off at least at one end. It is pointed out at this stage that the term liquid/vapor mixture is also intended to include a liquid/gas mixture.

4 Claims, 9 Drawing Figures

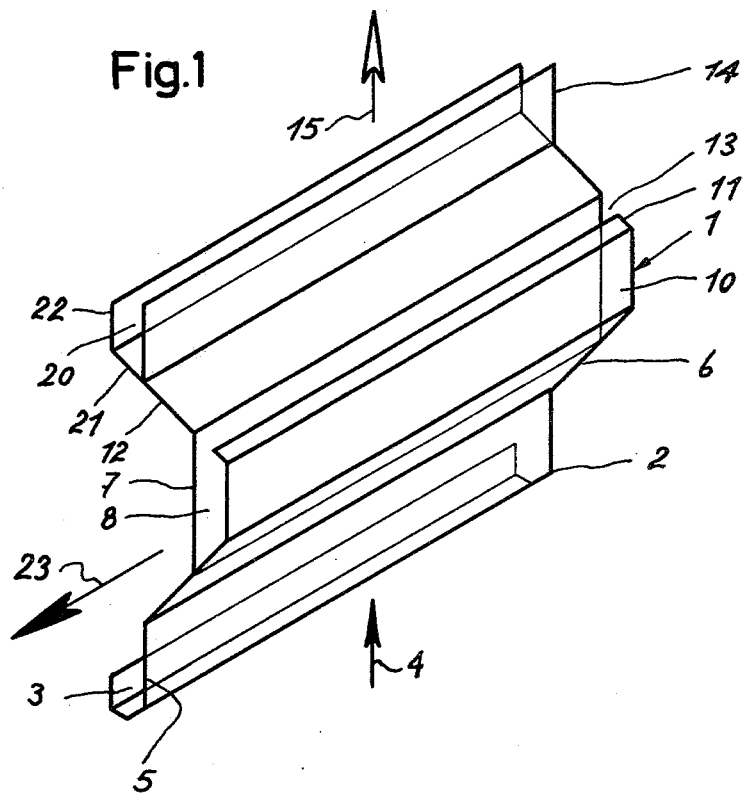
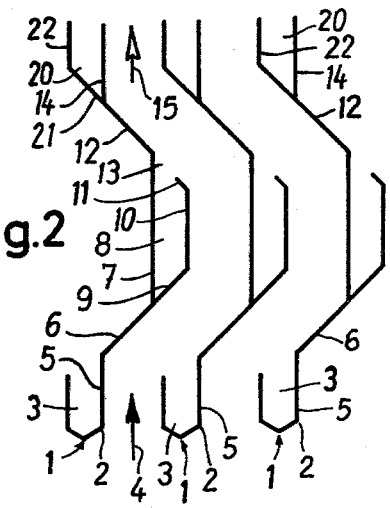
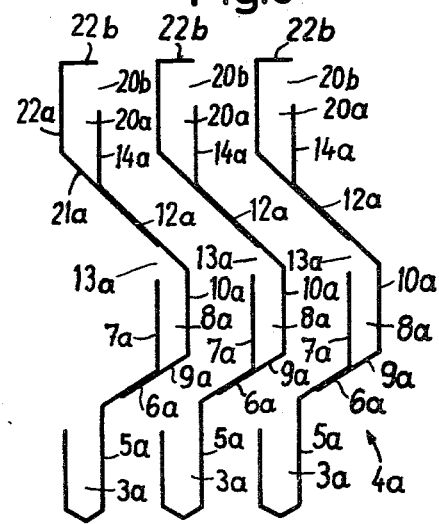

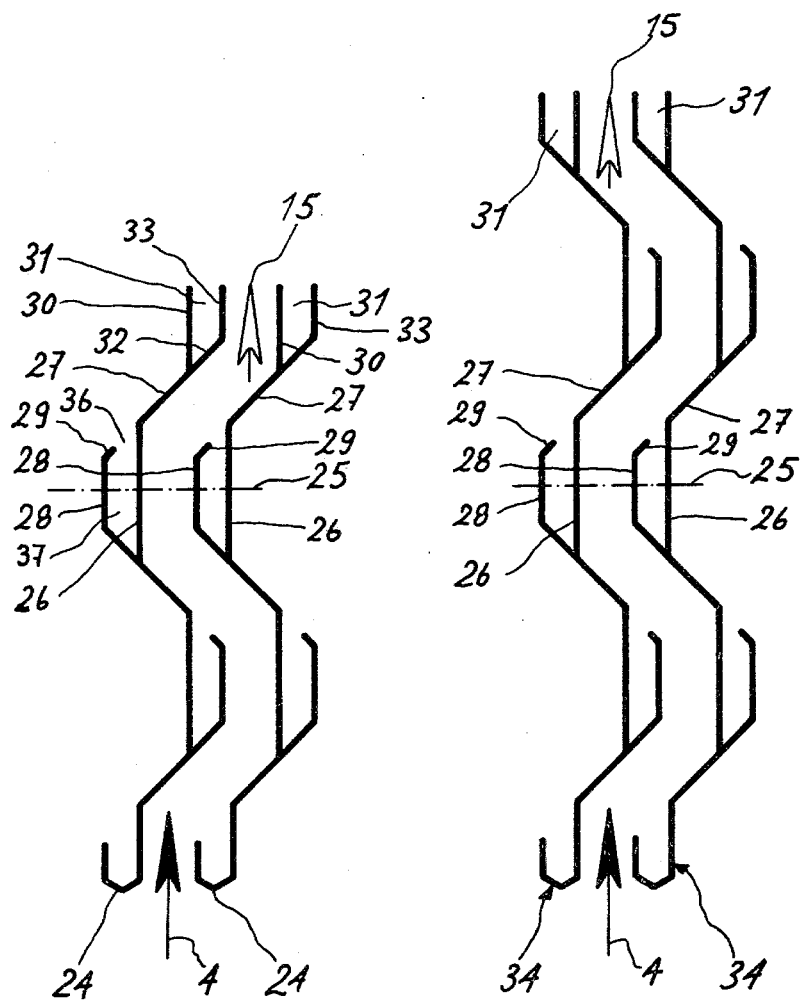

FIN DEFLECTOR FOR SEPARATING LIQUID FROM A LIQUID/VAPOR MIXTURE

Separators in the form of fin deflectors are already known for separating liquid that is carried along by vapour or gas. Such separation may inter alia be desirable for reasons of economy or for the preservation of the environment as well as for the protection of the plant in which the separators are used.

A separator of the kind in question is for example known from German Specification No. 2,345,307. It comprises a series of juxtaposed shaped fins, each consisting of three walls. The two outer walls consist of sheet metal bent to zig-zag formation, the individual sections of the two outer sheets extending parallel to each other except at the top and bottom. Between these two outer sheets there is a further sheet which forms liquid collecting channels alternately in conjunction with the one or the other outer sheet. The outer sheets as well as the interposed further sheet are clamped together in direct superposition at the upper and lower ends.

At those areas where the liquid/vapour mixture impinges, i.e. the baffle surfaces, the outer sheets of these shaped fins contain slots extending in the longitudinal direction of the fins. When the liquid/vapour mixture impinges on these baffle surfaces, part of the liquid will separate at these surfaces and continue to move on these surfaces in the direction of throughflow until this liquid meets the next following slot through which it can then enter the collecting channel. These slots in the baffle surfaces cause the arriving mixture to swirl and undesirably interfere with the flow pattern.

It is the object of the present invention to increase the separating efficiency of fin deflextors and at the same time keep flow losses as low as possible.

In a fin deflector according to the invention, the collecting channels are open at the downstream side of the deflector. Accordingly, the collecting channels are arranged so that they will not produce eddying of the mixture passed through the separator and nevertheless efficiently receive the liquid separated by the shaped fins.

Other features of the invention are the subject of subsidiary claims and will become apparent from examples described in the following description with reference to the accompanying drawings wherein:

FIG. 1 is a perspective view of a shaped fin with a baffle face;

FIG. 2 is an end view of three juxtaposed shaped fins according to FIG. 1 having a normal height in the throughflow direction;

FIG. 3 is an end view of three juxtaposed shaped fins of a second embodiment;

FIG. 4 is an end view of two juxtaposed shaped fins having three halves of the normal height;

FIG. 5 is an end view of two juxtaposed fins having twice the normal height;

Figure 6:
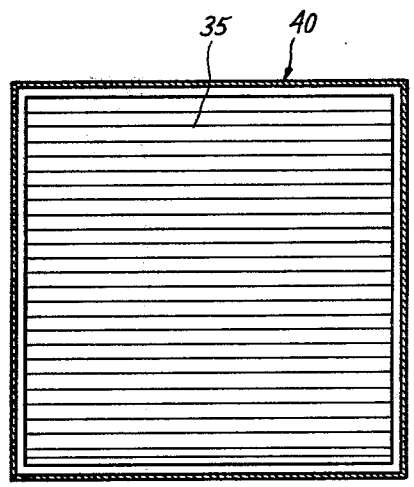
FIG. 6 is a diagrammatic elevation of a fin deflector having a rectangular housing.

Reference will first be made to FIGS. 1 and 2 showing the construction of a shaped fin 1 having a normal height in the throughflow direction. The term shaped fin of normal height is intended to mean a fin provided with three collecting channels. At its lower edge 2, each shaped fin 1 defines an upwardly open lower collecting channel 3 which is substantially U-shaped in the illustrated embodiment. One limb of this lower collecting channel 3 constitutes an upstream section 5 which extends parallel to the direction of flow of the arriving liquid/vapour mixture indicated by the arrow 4. Adjoining this upstream section 5 there is a baffle face section 6 which, in relation to the upstream section 5, is inclined away from the lower collecting channel 3 of the fin. The baffle face section 6 is followed by a section 7 which extends parallel to the throughflow direction of arrow 4 and which forms one wall of a second collecting channel 8. The remainder of the second collecting channel 8 is bounded by an upper partial surface 9 of the baffle face section 6, which partial surface projects beyond the junction with the section 7, and by a surface piece 10 which extends parallel to the section 7 and which is connected to the upper edge of the partial surface 9.

At its upper end the surface piece 10 comprises an end section 11 of which the inclination is equal and opposite to that of the baffle face section 6.

The upper edge of the section 7 is followed by a guide face section 12 of which the inclination is likewise equal and opposite to that of the baffle face section 6 and thus corresponds to the inclination of the end section 11. The end section 11 and the guide face section 12 are aligned and form an inlet slot 13 between each other. The guide face section 12 is connected to a section 14 which is parallel to the arriving flow of liquid/vapour mixture according to arrow 4 as well as to the flow-off direction indicated by the arrow 15. The section 14 forms one wall of an upper collecting chamber 20 the rest of which is bounded by a partial surface 21 of the guide face section 12 which projects beyond the junction with the section 14 and by a surface piece 22 which extends parallel to the section 14 and which is connected to the upper edge of the partial surface 21. The upper edges of the section 14 as well as of the surface piece 22 are disposed at the same height. All collecting channels of one shaped fin 1 are open towards the top, i.e. at the downstream side of the deflector.

The juxtaposed shaped fins 1 shown in FIG. 2 each have the flanged construction as just described. Every two adjacent fins define between each other a substantially sinusoidal flow passage.

In FIG. 1, the arrow 23 indicates the direction of liquid flow in the collecting channels 3, 8 and 20.

FIG. 3 shows a second embodiment of shaped fins very similar to that of FIGS. 1 and 2 and which in particular is also suitable for reliably separating fine liquid particles contained in the mixture, such separation being brought about by an increase in the flow velocity in the region of the baffle face. Elements employed in both embodiments are indicated by the same reference numeral but in FIG. 3 contain the suffix 'a'.

The shaped fins according to FIG. 3 likewise have a substantially U-shaped lower collecting channel 3a which is bounded on one side by an upstream section 5a adjoining a baffle face section 6a. In the example, this baffle face section 6a is inclined 60° to the direction of arriving flow indicated by the arrow 4a. Aligned with the baffle face section 6a there is a partial surface 9a which is again followed by a surface piece 10a extending parallel to the upstream section 5a. Connected to this surface piece 10a there is a guide face section 12a and an aligned partial face 21a of which the inclination relatively to the arriving flow direction indicated by the arrow 4a is markedly less than the inclination of the baffle face section 6a. A section 7a which extends from the baffle face section 6a parallel to the surface section 10a terminates at a spacing below the guide face section 12a so that a second collecting channel 8a with an inlet slot 13a is produced.

The upper end of the guide face section 12a is followed by a section 14a extending parallel to the arriving flow direction according to arrow 4a. Parallel to this section 14a, a surface piece 22a extends from the end of the partial surface 21a, projects upwardly beyond the section 14a and is connected at its upper end to a cover face section 22b. The latter is normal to the surface section 22a and, in the illustrated example, extends up to the plane of the section 14a but it could also be shorter. Between the free end of the cover face section 22b and the upper end of the section 14a there is thus formed an inlet slot 20b for an upper collecting chamber 20a.

The steep inclination of the baffle face section 6a leads to a considerable increase in the flow velocity of the mixture in this region, thereby ensuring that the fine liquid particles or droplets contained in the mixture are immersed in a liquid film formed on the section 7a and are carried along thereby into the collecting chamber 8a. Fine liquid droplets are also separated at the section 14a to reach the upper collecting chamber 20a. The cover face section 22b prevents these droplets from being pulled along beyond the upper end of the fin deflector.

The shaped fins 24 according to FIG. 4 correspond to those according to FIGS. 1 and 2 from the upstream side at the arrow 4 up to the level of the chain-dotted line 25. Above this line 25, the profile of the fins 1 is continued by half their height so that the fins of this embodiment contain a total of four collecting channels. The section 14 (FIGS. 1, 2) is in this case extended and forms a section 26 followed at its upper edge by a further baffle face section 27 which is at an inclination to the arriving flow according to arrow 4 or to the flow-off direction according to arrow 15. The surface piece 22 of the FIGS. 1 and 2 construction is likewise extended to form a surface piece 28 which is followed at its upper edge by an end piece 29 which is inclined at the same angle as the baffle face section 27 and is aligned therewith. Between the end piece 29 and the baffle face section 27 there is an inlet slot 36 for a collecting chamber 37 disposed between the section 26 and the surface piece 28.

The baffle face section 27 is coupled to a section 30 which extends parallel to the flow-off direction of arrow 15 and forms one wall of an upper collecting channel 31. The remainder of channel 31 is bounded by a partial surface 32 projecting beyond the junction with the section 30 and by a surface piece 33 which extends parallel to the section 30 and terminates at the same height as same. Similarly, an extension of the shaped fins of FIG. 3 is also possible.

FIG. 5 shows two juxtaposed shaped fins 34 which, analogously with the shaped fins 24, are derived from the shaped fins 1 of normal height, have substantially twice the height of the shaped fins 1 and contain five collecting channels per fin.

FIG. 6 illustrates a fin deflector with a rectangular housing 40 in which a series of parallel shaped fins 35 are indicated. This fin deflector has an overall rectangular throughflow cross-section.

Figure 7:
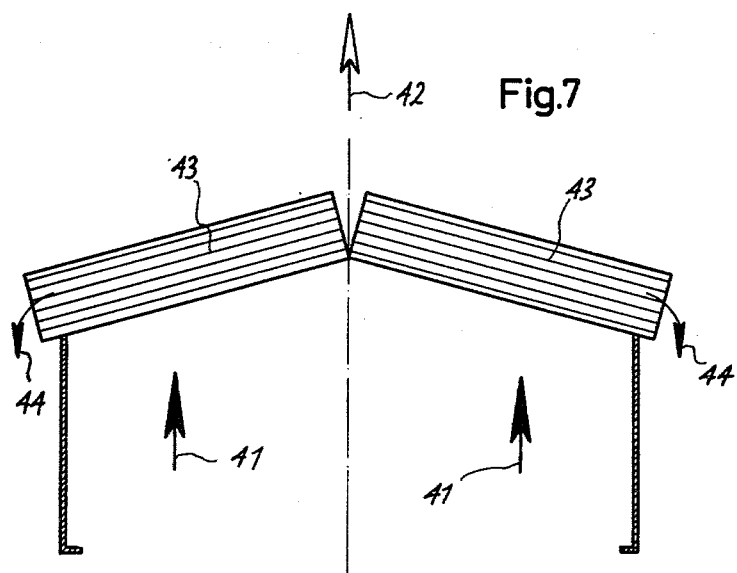
FIG. 7 is a diagrammatic elevation of a fin deflector composed of two sections inclined to each other in roof formation.

FIG. 7 illustrates a fin deflector in which arrows 41 indicate the arriving direction of flow of the liquid/vapour mixture and the arrow 42 indicates the flow-off direction. In this construction, the fin deflector is composed of two sections 43 which are inclined to each other in roof formation and each of which comprises a multitude of parallel shaped fins. The arrows 44 show the direction of flow of the liquid leaving the shaped fins. In this embodiment, the fin deflector may exhibit an overall polygonal or circular cross-section.

Figure 8:
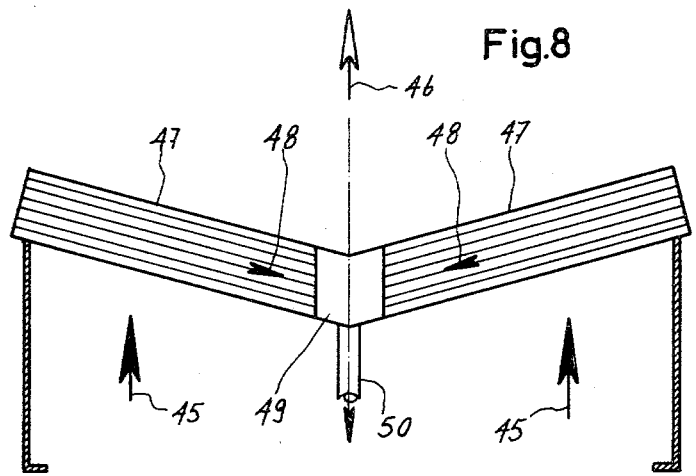
FIG. 8 is a diagrammatic elevation of a fin deflector composed of two sections inclined to each other in V formation.

In the embodiment according to FIG. 8, arrows 45 indicate the arriving direction of flow whilst the arrow 46 gives the flow-off direction. In this embodiment, the fin deflector comprises two sections 47 which are inclined to each other in V formation. The arrows 48 indicate the flow direction of the separated liquid. A collecting chamber 49 formed between the sections 47 is followed by an outlet pipe 50. The fin deflector of this embodiment may likewise have an overall polygonal or circular cross-section.

Figure 9:
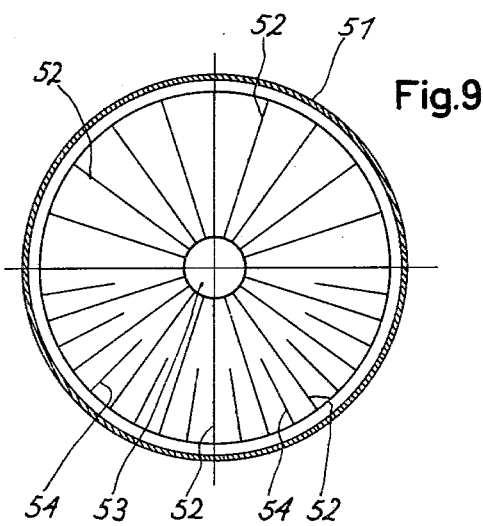
FIG. 9 is a diagrammatic elevation of a fin deflector with radially disposed fins, the deflector according to the lower half of the drawing comprising twice the number of fins in the radially outer region than in the radially inner region.

Finally, FIG. 9 shows a diagrammatic representation of a fin deflector with radially extending shaped fins. The fin deflector has a circular, i.e. cylindrical housing 51. The upper half of this composite figure shows the housing 51 with a set of radially directed shaped fins 52 extending from the inner face of the housing up to a central chamber 53 which can be used to discharge the liquid. In the embodiment represented by the upper half of FIG. 9, the spacing between the individual fins 52 varies considerably in the radial direction. To minimise this to some extent, the embodiment represented by the lower half of composite FIG. 9 makes provision for a second set of additional shaped fins 54 inserted in the housing 51. The additional fins 54 start from the inner surface of the housing 51 and extend inwardly over only part of the housing radius so that the spacing between the individual fins is more uniform. The shaped fins 52 and 54 may be inclined radially inwardly or radially outwardly.

The function of the shaped fins will now be described with reference only to FIGS. 1 and 2 because the function of the fins according to FIGS. 4 and 5 and thus of the fin deflectors according to FIGS. 6 to 9 will be self-evident from this description.

The embodiments of the fin deflector according to the invention make use of the shaped fins according to FIGS. 1 to 5, their dimensions, particularly the height as measured in the throughflow direction being adapted to particular requirements.

A liquid/vapour mixture arriving directly from a heat exchanger or by way of a pipe conduit first of all enters the grid of fins in the direction of the arrow 4. A marked proportion of the liquid drops contained in the mixture is reflected by the baffle face sections 6 of the individual fins 1 in such a way that these drops impinge on the fin bounding the opposite side of the flow channel in question and are there for the most part led downwardly into a lower collecting channel 3. These lower collecting channels 3 above all prevent liquid from dripping out of the fin deflector that would otherwise have to be lifted again by the arriving mixture. On impingement of the mixture at the baffle face sections 6, a further proportion of the liquid drops is pushed upwardly along these baffle face sections and partly enters the second collecting channel 8 by way of the surface piece 10 and the end section 11. Substantially in the region of the transition from the baffle face section 6 to the surface piece 10, a further proportion of these liquid drops will be carried along by the flow of the mixture to the oppositely disposed fin and then for the most part carried along by liquid flowing off towards a lower collecting channel 3. The throughflowing mixture will now be further deflected by the following surface sections of the fins and reflected so as to bring any liquid droplets still contained in the mixture close to a fin at which they will either flow downwardly under gravity or be carried along upwardly by the flow of mixture to the next following collecting channel. Just before the flow leaves the fin deflector, the upper collecting channels 20 still deflect part of any remaining liquid droplets so that they are caught in the upper collecting channels.

I claim:

1. A device for separating a mixture of liquid and gas comprising:

a plurality of generally sinusoidally shaped elements spaced one from the other forming surfaces on which said mixture is impinged, said surfaces extending transversely to the direction of flow of said mixture through said device; and a plurality of collecting channels within said surfaces, said collecting channels being disposed to collect liquid therein and transport the collected liquid transversely to the direction of flow of said mixture through said device, said collecting channels being in flow communication with the space between said surfaces by means of openings on said surfaces, each of said openings being oriented on said surfaces to open in a downstream direction.

2. The device of claim 1 wherein flow of said mixture through said device is generally in the upward direction, said device including transverse lower channels on the lower most extremity of said elements, said lower channels having an opening facing generally upward.

3. The device of claim 2 including transverse upper channels on the upper extremity of said elements, said upper channels having an opening disposed in the upward direction.

4. The device of claim 3 wherein said upper channels are comprised of:

an inner deflector generally parallel to the direction of flow through said device;

an outer member generally parallel to said inner deflector; and an upper cover member at right angles to said outer member, said upper cover member extending over at least a portion of the width of an upper collecting channel.

* * * * *